US 012443584B2

(12) United States Patent
Schuler et al.

(10) Patent No.: US 12,443,584 B2
(45) Date of Patent: Oct. 14, 2025

(54) DEVICE, SYSTEM, AND METHOD FOR PROVIDING AN INDICATION THAT MEDIA HAS NOT YET BEEN UPLOADED TO A DATA STORE

(71) Applicant: MOTOROLA SOLUTIONS, INC., Chicago, IL (US)

(72) Inventors: Francesca Schuler, Chicago, IL (US); Steven D. Tine, Chicago, IL (US); Michael D. Heikka, Chicago, IL (US); Nadeem Z. Kureishy, Chicago, IL (US); Brian J. Frommelt, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 310 days.

(21) Appl. No.: 17/362,190

(22) Filed: Jun. 29, 2021

(65) Prior Publication Data

US 2022/0414082 A1 Dec. 29, 2022

(51) Int. Cl.
*G06F 16/23* (2019.01)
*G06Q 50/00* (2024.01)

(52) U.S. Cl.
CPC .................. *G06F 16/2358* (2019.01)

(58) Field of Classification Search
CPC .................................. G06F 16/2358
See application file for complete search history.

(56) References Cited

U.S. PATENT DOCUMENTS

| 8,941,677 | B1* | 1/2015 | Hallenbeck | H04W 4/02 |
| | | | | 345/55 |
| 10,198,582 | B2 | 2/2019 | Linde et al. | |
| 10,693,903 | B2 | 6/2020 | Linde et al. | |
| 10,977,927 | B2* | 4/2021 | Katz | G08B 19/00 |
| 2008/0301757 | A1 | 12/2008 | Demarest et al. | |
| 2015/0186831 | A1* | 7/2015 | Hulbert | H04L 51/23 |
| | | | | 705/7.15 |
| 2016/0182707 | A1* | 6/2016 | Gabel | G06F 3/04883 |
| | | | | 455/404.2 |
| 2019/0174289 | A1* | 6/2019 | Martin | H04M 3/5141 |

(Continued)

FOREIGN PATENT DOCUMENTS

WO WO-2018232931 A1 12/2018

OTHER PUBLICATIONS

Charles A. Moore, Body Worn Camera (BWC), Date: Jan. 24, 2020, URL: https://belairmd.org/DocumentCenter/View/3964/Body-Worn-Camera-BWC (Year: 2020).*

(Continued)

*Primary Examiner* — Brittany N Allen
*Assistant Examiner* — Earl Levi Elias
(74) *Attorney, Agent, or Firm* — PERRY + CURRIER INC.

(57) ABSTRACT

A device, system, and method for providing an indication that media has not yet been uploaded to a data store is provided. A device identifies a participant associated with an incident, the participant associated with a recording device. The device, in response to determining that media from the recording device has not yet been uploaded to a data store within a threshold time limit after occurrence of the incident: provides, at a display screen, an indication that the media has not yet been uploaded to the data store.

18 Claims, 6 Drawing Sheets

(56) References Cited

U.S. PATENT DOCUMENTS

| 2020/0312046 | A1 | 10/2020 | Righi et al. |
| 2021/0006960 | A1* | 1/2021 | Martin ................... G01C 21/16 |
| 2021/0120394 | A1* | 4/2021 | Martin ................... H04W 4/029 |
| 2021/0150654 | A1 | 5/2021 | Moradzadeh et al. |
| 2021/0212168 | A1* | 7/2021 | Yoden ................... H04W 88/06 |
| 2022/0335154 | A1 | 10/2022 | Schuler et al. |

OTHER PUBLICATIONS

Axon Evidence downloaded from https://www.axon.com/products/axon-evidence—published on May 4, 2021.
PCT/US2022/024581, Device, System, and Method for Providing an Indication that Media Has Not Yet Been Uploaded to a Data Store, Apr. 13, 2022, No.

\* cited by examiner

DEVICE, SYSTEM, AND METHOD FOR PROVIDING AN INDICATION THAT MEDIA HAS NOT YET BEEN UPLOADED TO A DATA STORE

BACKGROUND OF THE INVENTION

Public safety agencies generally have a responsibility to ensure records content is complete and/or accurate.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
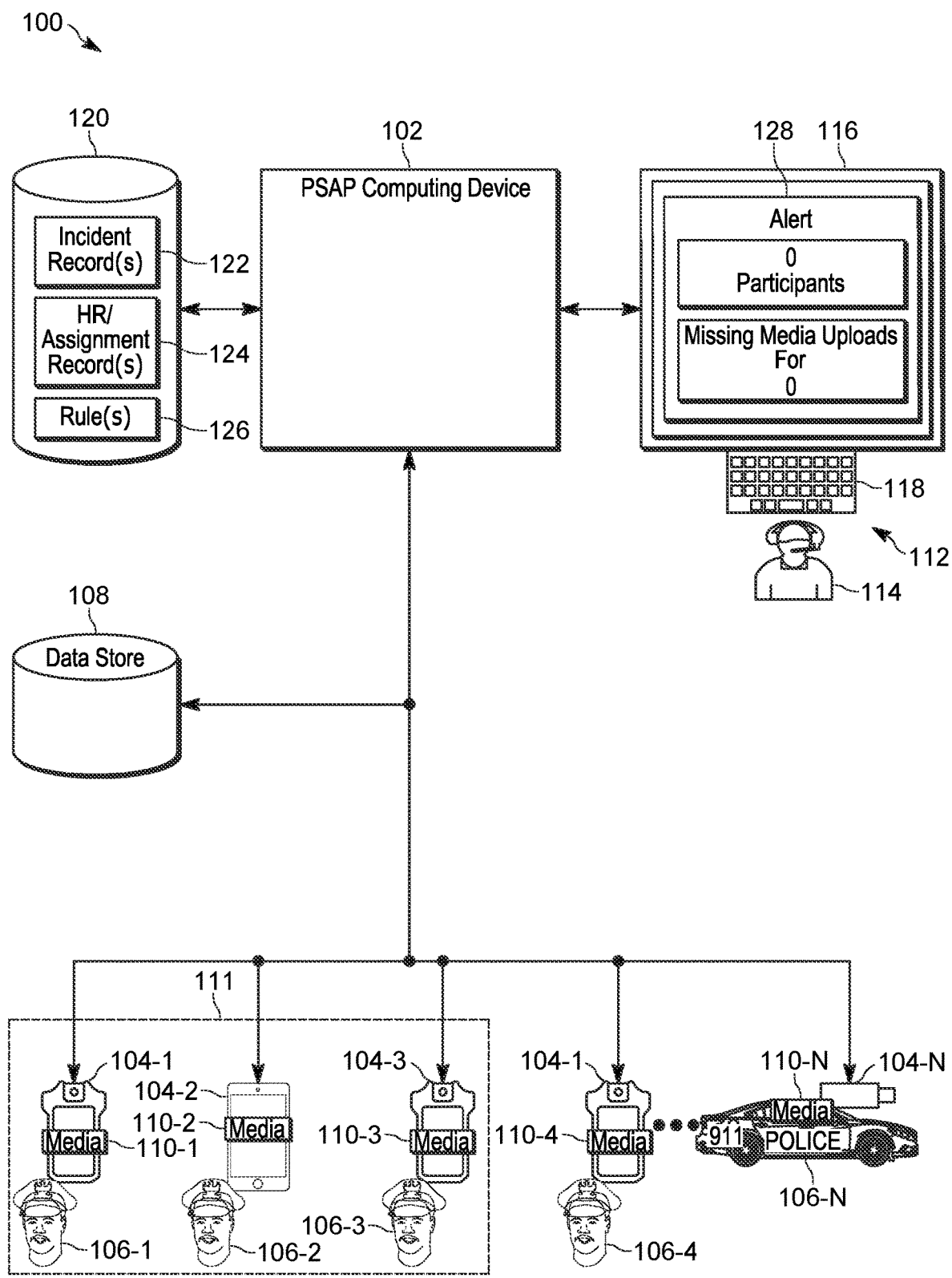
FIG. 1 is a system for providing an indication that media has not yet been uploaded to a data store, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety agencies, such as police departments, generally have a responsibility to ensure records content is complete and/or accurate. Similarly, public safety agencies may have a responsibility to ensure public safety personnel, such as police officers, are complying with policies with regards to providing data to a data store, such as media, and the like. Thus, there exists a need for an improved technical method, device, and system for providing an indication that media has not yet been uploaded to a data store.

Hence, provided herein is a device, system, and method for providing an indication that media has not yet been uploaded to a data store. For example, a computing device of a public-safety answering point (PSAP) may use rules, which define public safety agency policies on when media is to be uploaded to a data store; in particular, the PSAP may be operated by, and/or associated with, a public safety agency, interchangeably referred to hereafter as an agency. Media that may be uploaded to a data store may include audio, video, and the like, associated with an incident, to which public safety personnel and/or first responders have been dispatched. For example, a rule and/or a policy may define that media associated with an incident is to be uploaded to a data store within 24 hours of first responders and/or vehicles and/or units being dispatched to the incident. As provided herein, a computing device identifies a participant associated with an incident, such as a particular public safety personnel and/or a particular public safety vehicle and/or a particular public safety unit, and the like. Furthermore, the computing device identifies a recording device associated with the participant, such as a body-worn camera (BWC), a mobile device that includes a camera and/or a microphone, a dashcam, and the like. The identification of the participant may occur via a record, such as an incident record, that indicates that the participant was dispatched to an incident; similarly identification of an associated recording device may occur via a record, such as human resources and/or device assignment records, that indicates that the participant was assigned the recording device.

The computing device generally determines whether media from the recording device has been uploaded to a data store within a threshold time limit after occurrence of the incident. The threshold time limit may be the same for all incidents, or the threshold time limit may vary by incident type and/or events associated with an incident, such as reported use of force in an incident, among other possibilities. Regardless, the computing device, in response to determining that media from the recording device has not yet been uploaded to a data store within a threshold time limit after occurrence of the incident, provides, at a display screen, an indication that the media has not yet been uploaded to the data store. For example, such an indication may be provided at a display screen of a PSAP terminal operated by a dispatcher, and the like.

The indication may identify that a participant has not uploaded the media, as well as an associated time period (e.g., after the occurrence of the incident, and/or a time period that exceeds the threshold time limit, and the like), within which the media has not yet been uploaded. Furthermore, in some specific examples, such an indication may be provided in a card-based environment at the display screen; for example, in a card-based environment, incidents and/or calls may be represented at display screens of terminals of PSAPs as cards; as such the indication provided herein may be provided at a card that is different from incident and/or call cards. However, such an indication may be provided in any other suitable type of environment (e.g., which may be different from card-based environments).

An aspect of the present specification provides a method comprising: identifying, by a computing device, a participant associated with an incident, the participant associated with a recording device; and in response to determining that media from the recording device has not yet been uploaded to a data store within a threshold time limit after occurrence of the incident: providing, by the computing device, at a display screen, an indication that the media has not yet been uploaded to the data store.

Another aspect of the present specification provides a device comprising: a controller communicatively coupled to a display screen, the controller configured to: identify a participant associated with an incident, the participant associated with a recording device; and in response to determining that media from the recording device has not yet been uploaded to a data store within a threshold time limit after occurrence of the incident: provide, at the display screen, an indication that the media has not yet been uploaded to the data store.

Each of the above-mentioned aspects will be discussed in more detail below, starting with example system and device architectures of the system in which the embodiments may be practiced, followed by an illustration of processing blocks for achieving an improved technical method, device, and system for providing an indication that media has not yet been uploaded to a data store.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for providing an indication that media has not yet been uploaded to a data store. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

Furthermore, hereafter, reference will be made to participants, and the like, being assigned to an incident; such an assignment is understood to associate the participants with the incident, though association with an incident may occur in any suitable manner that is different from an assignment, For example, participants may be the first to arrive at an incident and hence are associated with the incident. Put another way, participants, and the like, being assigned to an incident is a special case of participants being associated with an incident and any suitable association with an incident, and the like, for participants and/or other features, is within the scope of the present specification.

The system 100 comprises a computing device 102, such a PSAP computing device 102. The computing device 102 may comprise a server and/or a cloud computing device, and/or any suitable computing device in any suitable format. In some examples, functionality of the computing device 102 may be distributed over a plurality of servers, a plurality of cloud computing devices and the like. Details of the computing device 102 are described in more detail below with respect to FIG. 2.

The system 100 further comprises one or more recording devices 104-1, 104-2, 104-3, 104-4 . . . 104-N associated with one or more participants 106-1, 106-2, 106-3, 106-4 . . . 106-N, who may be associated with one or more incidents. Hereafter the one or more recording devices 104-1, 104-2, 104-3, 104-4 . . . 104-N will be interchangeably referred to, collectively, as the recording devices 104 and, generically (e.g., in the singular) as a recording device 104. This convention will be used throughout the present specification. For example, the one or more participants 106-1, 106-2, 106-3, 106-4 . . . 106-N will be interchangeably referred to hereafter as the participants 106 and/or a participant 106.

While the computing device 102 is depicted as being in communication with the recording devices 104 via respective links, and the recording devices 104 are depicted as being able to communicate with each other, also via respective links, the computing device 102 and the recording devices 104 may communicate with each other, or not, in any suitable manner and/or in any suitable combination.

As depicted, the system 100 further comprises a data store 108, which, as depicted, is provided in the form of a database, however the data store 108 may be in any suitable format and/or may be provided as one or more memories, one or more databases, one or more cloud computing devices, and the like, and/or a combination thereof.

As depicted, the recording devices 104 may be operated (e.g., by a respective participant 106 and/or another participant, and the like) to upload respective media 110-1, 110-2, 110-3, 110-4 . . . 110-N (e.g., media 110) to the data store 108. It is further understood that, in some examples, media 110 from a respective recording device 104 may be uploaded to the data store 108 via an intermediary device, such as a hub device of a personal area network (PAN) of a participant, of which a recording device 104 may be but one component. Furthermore, the media 110 may be any suitable media that may be acquired by a recording device 104 including, but not limited to, images, audio, video, and/or a combination thereof, and/or any other suitable media that may be acquired in association with an incident. Other such suitable media may include, but is not limited to, text, forms, and the like.

The recording devices 104 may comprise any suitable devices, which acquire and record the media 110. As depicted, the recording devices 104-1, 104-3, 104-4 each comprise a body worn camera (BWC), the recording device 104-2 comprises a mobile communication device that includes a camera and/or a microphone, and the recording device 104-N comprises a dashboard video camera of a vehicle (e.g., a dashcam). However, the recording devices 104 may include any devices, which acquire and/or record the media 110. While a recording device 104 may stream respective media 110 (e.g., in real-time) to the data store 108, it is understood herein that a recording device 104 may record and store respective media 110 (e.g., at a respective memory) for later upload to the data store 108; hence, as depicted, respective media 110 is depicted at a respective recording device 104, to be later uploaded to the data store 108.

The participants 106 include any suitable participants that may respond to an incident, and/or be dispatched and/or assigned to an incident, including, but not limited to, a public-safety incident, such as a police incident, a fire related incident, a medical incident, and the like. The participants 106 may hence include, but are not limited to, public safety personnel and/or first responders (e.g., the participants 106-1, 106-2, 106-3, 106-4 comprise first responders such as police officers, and the like), a vehicle (e.g., the participant 106-N comprises a police vehicle), a unit, and the like. In particular, a unit is understood to include at least one public safety personnel and/or first responder, but may include more than one public safety personnel and/or first responder, and, optionally, a vehicle, and the like; for example, as depicted, the participants 106-1, 106-2, 106-3 are grouped together, as indicated by rectangle 111 and hence, hereafter, the participants 106-1, 106-2, 106-3 may be understood to be members of a unit who may be dispatched, and the like, to an incident.

Furthermore, while the participants 106 are described herein with respect to public safety personnel and/or first responders, and, more specifically, police officers, the participants 106 may comprise any suitable participants that may respond to, an incident, including, but not limited to, fire fighters, emergency medical technicians, and/or any suitable participant, such as private security guards, and the like. Similarly, incidents described herein may include, but are not limited to, public safety incidents and/or other types of incidents.

A number "N" of both recording devices 104 and participants 106 are depicted, and the number "N" may be any suitable number. Furthermore, there may be a same number "N" number of recording devices 104 and participants 106 (as depicted), or there may be different numbers of recording devices 104 and participants 106; for example, each participant 106 may be associated with one recording device 104, or a participant 106 may be associated with more than one recording device 104, or two participants 106 may be associated with one recording device 104, among other possibilities.

In some examples, a recording device 104 may be permanently assigned to a participant 106 (e.g., as in the case of the dashboard camera of the recording device 104-N attached to the vehicle of the participant 106-N), while in other examples a recording device 104 may be assigned to a participant 106, and/or checked out by a participant at the beginning of a shift (e.g., as may occur with the participants 106-1, 106-2, 106-3 and the recording devices 104-1, 104-2, 104-3, 104-4), and the like.

As depicted, the computing device 102 is further in communication with a PSAP terminal 112, operated, for example, by a user 114, such as a PSAP call-taker, a dispatcher, and the like. As depicted, the PSAP terminal 112 includes a display screen 116, and one or more input devices 118, such as keyboards, pointing devices and the like, and/or any suitable combination of components that enable a user 114 to communicate on a call (e.g., 911 calls to a PSAP) and/or dispatch participants 106 to incidents and the like. While only one PSAP terminal 112 is depicted with the computing device 102, the computing device 102 may be in communication with tens to hundreds of terminals 112, and/or any suitable number of PSAP terminals 112, which may be local to, and/or remote from, an associated PSAP and/or the computing device 102.

As depicted, the system 100 further comprises at least one memory 120 (e.g., depicted in the form of a database, but which may be in any suitable format, such as a cloud computing device, and/or incorporated into the computing device 102) that stores, as depicted, incident records 122, and human resources (HR) and/or device assignment records 124, and the like. In some examples, the at least one memory 120 may include other types of records, such as unit records, and/or unit history records, which record participants 106 of units (e.g., first responders and/or vehicles), and incidents to which respective units were assigned (e.g., which may include a date and/or time of the assignment and/or an incident). Such unit records may be combined with one or more of the records 122, 124 and/or stored as records different from the records 122, 124. Furthermore, the records 122, 124 (and the like) may be stored in different database and/or as separate sets of records in any suitable combination.

The computing device 102 is in communication with the at least one memory 120 (interchangeably referred to hereafter as the memory 120) and/or it is understood that the computing device 102 has access to the records 122, 124. In some examples, the memory 120 and the data store 108 may be combined and/or at least partially combined.

The incident records 122 generally enable the computing device 102 to determine given participants 106 assigned to given incidents. For example, when an incident occurs, an incident record 122 is generated, for example by a call taker (e.g., such as the user 114) receiving a call reporting the incident. Participants 106 are assigned and/or dispatched to the incident (e.g., by the user 114) and identifiers of the assigned participants 106 are stored at the incident record 122. Such identifiers may include, but are not limited to, names, badge numbers, vehicle numbers, unit numbers, and the like, of the assigned participants 106. An incident record 122 may further include incident identifiers (e.g., alphanumeric identifiers) identifying respective incidents.

Similarly, the records 124 generally enable the computing device 102 to determine given recording devices 104 assigned to given participants 106. For example, when a recording device 104 is assigned to a participant, an identifier of a recording device 104, such as an assigned alphanumeric identifier, a Media Access Control (MAC) address, and the like, is stored in a record 124 in association with an identifier of an assigned participant 106.

Hence, the records 122, 124 generally enable the computing device 102 to determine participants 106 associated with an incident, and recording devices 104 assigned to participants 106. However, the records 122, 124 may be combined and/or provided in any suitable manner and/or format (e.g., such as any suitable database format).

The media 110 may be uploaded to the data store 108, from a respective recording device 104 with an identifier of an associated participant 106, an identifier of an associated recording device 104, an associated incident identifier, and the like, and the data store 108 may store the media 110 accordingly.

The computing device 102 may determine, from the records 122, 124, participants 106 associated with an incident, and recording devices 104 assigned to the participants 106, and the computing device 102 may further determine, from the data store 108, whether, or not, media 110 associated with the incident has been uploaded from the recording devices 104 assigned to the participants 106, for example by matching identifiers (e.g., or by identifying a lack of a match of identifiers) stored in association with the media 110, with identifiers stored in the records 122, 124.

In particular, as will be described in further detail below, the computing device 102 may access the data store 108 to determine whether media 110 from a recording device 104 has been uploaded to the data store 108 within a threshold time limit after occurrence of an incident to which an associated participant 106 was assigned, and the like. The computing device 102, in response to determining that media 110 from a recording device 104 has not yet been uploaded to the data store 108 within a threshold time limit after occurrence of an incident generally provides, at a display screen, such as the display screen 116, an indication that the media 110 has not yet been uploaded to the data store 108.

Furthermore, a time period after occurrence of an incident may start from a time the incident occurred, a time an incident record (e.g., a record 122) for the incident was generated, a time that a participant 106 responded to, and/or was assigned to and/or dispatched to the incident, and/or any other suitable time.

As depicted, the memory 120 further stores one or more temporal upload rules 126 (interchangeably referred to hereafter as the rules 126), which define the aforementioned threshold time limits for uploading the media 110 to the data store 108.

For example, an agency, such as a public safety agency, overseeing the system 100, and of which the participants 106 may be employees and/or managed by the agency, may generally have policies that set out time limits for uploading media 110 to the data store 108. As such, the rules 126 are provided, which include threshold time limits for uploading the media 110 to the data store 108, which may be generally defined by the policies that set out time limits for uploading media 110 to the data store 108.

In some examples, there may be more than one rule 126, and/or rules 126 that correspond to different policies, which set out different threshold time limits for different conditions and/or different participants associated with incidents.

For example, different rules 126 may be provided for different incident types, with different corresponding threshold time limits. In particular examples, a rule 126 may be associated with a car accident incident type, and may indicate that media 110 collected for such an incident type, as acquired by a recording device 104 of a participant 106 assigned to such an incident, should be uploaded to the data store 108 within a threshold time limit of 48 hours after occurrence of the incident. Similarly, another rule 126 may be associated with a murder incident type, and may indicate that media 110 collected for such an incident type, as acquired by a recording device 104 of a participant 106 assigned to such an incident, should be uploaded to the data store 108 within a threshold time limit of 12 hours after occurrence of the incident. Other suitable rules 126 may be provided for other suitable incident types.

Hence, put another way, a threshold time limit for uploading media 110 to the data store 108, may be determined from temporal upload rules 126 that vary based on a type of an incident.

In other examples, other rules 126 may be provided, which define threshold time limits for uploading media 110 to the data store 108 based on a status of an associated participant 106. For example, different rules 126 may define different threshold time limits for uploading media 110 to the data store 108 based on whether an associated participant 106 is on-duty after an incident, or whether an associated participant 106 went off-duty during an incident. For example, a rule 126 may define a threshold time limit of "end of shift" for a participant 106 that is on-duty, another rule 126 may define a threshold time limit of 24 hours for a participant 106 that went off-duty within a threshold time after an incident ended and/or was closed (e.g., by a PSAP), and/or yet another rule 126 may define a threshold time limit of 12 hours after a beginning of a next shift for a participant 106 that went off-duty during an incident.

Yet other rules 126 that define threshold time limits for other types of statuses of participants may be provided. For example, a rule 126 may be provided that defines a threshold time limit "before vacation starts" for a participant 106 that is about to start a vacation.

Other rules 126 that define threshold time limit for yet other types of statuses of participants 106 are within the scope of the present specification. For example, a participant 106 on vacation may have failed to upload media 110 from an associated recording device 104 prior to the start of a vacation; as such, a rule 126 may be provided, which defines a threshold time limit of 24 hours after an "end of vacation" for a participant 106, and the like.

Times corresponding to an "end of shift" for a participant 106, a time a next shift starts for a participant, and/or a time that a vacation starts and/or ends for a participant 106 may be stored in the records 124 and/or any other suitable records.

Furthermore, other rules 126 may be provided that define other threshold time limit according to other factors.

For example, rules 126 may be provided that define threshold time limits for when an attempted upload of media 110 from a recording device 104 failed and/or was only partially complete. For example, an upload may include metadata that indicates a size of the upload, and an upload failing and/or being partially complete may be determined when an actual size of uploaded media 110 is less than the size indicated in the metadata. Alternatively, an upload failing may be determined when a connection with the recording device 104 (and the like) uploading the media 110 is lost. For example, a rule 126 may define a threshold time limit of 12 hours for uploading media 110 to the data store 108 from a recording device 104 when a previous upload of the media 110 failed and/or was only partially completed.

For example, rules 126 may be provided that define threshold time limits according to a rank and/or role of a participant 106. For example, a rule 126 may define a threshold time limit of 12 hours for uploading media 110 to the data store 108 from a recording device 104 of a participant 106 that has a rank of police captain and/or is assigned a role of "supervisor" for an incident, while another rule 126 may define a threshold time limit of 24 hours for uploading media 110 to the data store 108 from a recording device 104 of a participant 106 that has a rank of a patrol officer and/or is assigned a role of "officer" and/or "subordinate" (and the like) for an incident. Ranks and/or roles of participants 106 may be stored at the records 124 and hence the computing device 102 may determine ranks of participants 106 from the records 124.

Yet other rules 126 may be provided that define other threshold time limits according to a history of a participant 106 and/or late uploads. For example, some participants 106 may be assigned two or more recording devices 104, and a rule 126 may be provided, which defines a threshold time limit of 12 hours for uploading media 110 to the data store 108 from a recording device 104 of a participant 106 when media 110 from one associated recording device 104 has been uploaded to the data store 108, but not media 110 from another associated recording device 104. For example, such a threshold time limit may be within 72 hours of occurrence of an associated incident.

Similarly, rules 126 may be provided that define other threshold time limits according to a history of the participants 106 that are units. For example, a rule 126 may be provided, which defines a threshold time limit of 12 hours for uploading media 110 to the data store 108 from a recording device 104 of one participant 106 of a unit when respective media 110 from respective recording devices 104 of other participants 106 of the unit has already been uploaded to the data store 108. For example, such a threshold time limit may be within 24 hours of occurrence of an associated incident.

Similarly, a history of a participant 106 may indicate that the participant 106 consistently uploads media 110 past a threshold time limit; as such, a rule 126 may be provided, which defines a threshold time limit of 8 hours for uploading media 110 to the data store 108 from a recording device 104 of such a participant 106; such a rule 126 may be used when a number of times that the participant 106 has uploaded media 110 past a threshold time limit is greater than a threshold number of times (e.g., such as 5 times, and/or any other suitable number of times). In some examples, a rule 126 may be provided which defines a given reduction of a threshold time limit for such a participant 106; for example, a first rule 126 may be used to define a given threshold time limit according to any of the factors described herein, and/or any other suitable factors; and, when an associated participant 106 has a history of uploading media 110 past a threshold time limit, a second rule 126 may be used to reduce the given threshold time limit by a suitable amount, such as 80%, and/or any other suitable reduction. Indeed, rules 126 defining reductions of given threshold time limit of other rules 126 may be used in any suitable manner with any other suitable rules 126.

Put another way, a threshold time limit may be determined by the computing device 102 from temporal upload rules 126 that vary based on one or more of: a type of an incident, a status of a participant 106, a rank of a participant 106, a history of a participant 106, and the like, and/or a combination thereof.

Other rules 126 may be provided that define other threshold time limits according to whether a given event occurred in responding to an incident.

For example, a rule 126 may be provided that define threshold time limits for uploading media 110 of recording devices 104 of participants 106 associated with incidents in which given events occurred and/or which are associated with given events. For example, a rule 126 may be provided, which defines a threshold time limit of 12 hours for uploading media 110 of recording devices 104 of participants 106 associated with incidents in which use of force occurred (e.g., by a participant 106 and/or by a suspect in an incident), as indicated by an associated incident record 122.

Similarly, a rule 126 may be provided, which defines a threshold time limit of 6 hours for uploading media 110 of recording devices 104 of participants 106 associated with incidents in which a gunshot event occurred (e.g., a gun was discharged by a participant 106 and/or by a suspect in an incident), as indicated by an associated incident record 122.

Similarly, a rule 126 may be provided, which defines a threshold time limit of 24 hours for uploading media 110 of recording devices 104 of participants 106 associated with incidents in which an emergency medical event occurred (e.g., a participant 106 and/or a suspect in an incident was injured), as indicated by an associated incident record 122.

Other events may include, but are not limited to: a complaint occurring against a participant 106 in association with an incident; an incident being responded to by a participant due to a 911 call and/or a tip; and the like. Such events may be determined by the computing device 102 based on transcripts of calls, and the like, to user 114, and the like. Furthermore, rules 126 for such events may be provided with corresponding threshold time limits.

Indeed, rules 126 may be provided for any suitable given events. Put another way, a threshold time limit may be determined by the computing device 102 from temporal upload rules 126 that vary based on whether a given event occurred in association with an incident.

Other rules 126 may be provided that define other threshold time limits according to whether one or more of media or social media coverage of an incident occurred. For example, a rule 126 may be provided, which includes a threshold time limit of 24 hours for uploading media 110 to the data store 108 from a recording device 104 when an associated incident has received electronic coverage, and the like, from a media organization (e.g., at a website thereof). Another rule 126 may be provided, which includes a threshold time limit of 12 hours for uploading media 110 to the data store 108 from a recording device 104 when an associated incident has received social media coverage and/or been mentioned on social media, and the like. A threshold time limit of such rules 126 may further vary based on an amount of media and/or social media coverage, with rules 126 being provided that define shorter threshold time limits as numbers of media posts and/or social media posts (and/or likes and/or shares) increase. For example, a threshold time limit may decrease as numbers of media posts and/or social media posts (and/or likes and/or shares) increase; in some of these examples, the threshold time limit may decrease to no lower than a minimum threshold time limit to account for at least some participants 106 needing a minimum amount of time to operate a respective recording device 104 to upload associated media 110 to the data store 108 while balancing other duties. Indeed, in some examples, a rule 126 may define a dynamic threshold time limit, which changes according to an algorithm provided by the rule 126 (e.g., based on numbers of media posts and/or social media posts, and a minimum threshold time limit, among other possibilities).

In yet further examples, rules 126 may be provided based on a location of an incident; for example, a location of the incident may be stored in an incident record 122. Some locations may be designated as being in "high crime areas" while other locations may be designated as being in "low crime areas", and/or locations may be distinguished from each other, and/or categorized, in any suitable manner. As such, a rules 126 may be provided, which define different threshold time limits for different categories of locations. For example, a rule 126 may be provided, which includes a threshold time limit of 12 hours for uploading media 110 to the data store 108 from a recording device 104 when an associated incident occurs in a "high crime area", and another rule 126 may be provided, which includes a threshold time limit of 24 hours for uploading media 110 to the data store 108 from a recording device 104 when an associated incident occurs in a "low crime area".

Put another way, a threshold time limit may be determined by the computing device 102 from temporal upload rules 126 that vary based on whether an incident has received one or more of media or social media coverage. In these examples, the computing device 102 is understood to be enabled to communicate with, and monitor, one or more of media websites and/or social media websites, and the like.

In examples where the computing device 102 determines that more than rule 126 may be used in determining a threshold time limit for uploading media to the data store 108, the computing device 102 may select the rule 126 having the smaller threshold time limit. For example, when an incident occurs that is of a murder incident type, and a participant 106 of a patrol officer is assigned to the incident, a first rule 126 may define a first threshold time limit of 12 hours to upload media 110 from a recording device 104 of the participant 106 for the murder incident type, and a second rule 126 may define a second threshold time limit of 24 hours to upload media 110 from a recording device 104 of a participant 106 being a patrol officer. In these examples, the computing device 102 may apply the first rule 126 such that media 110 from a recording device 104 of the patrol officer is to be uploaded within 12 hours, and not 24 hours (e.g., as the threshold time limit of 12 hours is smaller than the threshold time limit of 24 hours).

Alternatively, as mentioned previously, the computing device 102 may determine that a first rule 126 (e.g., a primary rule 126) may be used to determine a threshold time limit, and the computing device 102 may determine that a second rule 126 (e.g., a secondary rule 126) may be used to reduce the threshold time limit by a given amount. While such a reduction was described above with respect to a history of a participant 106 in late uploading of media 110, secondary rules 126 may be provided for any suitable factors. In some of these examples, secondary rules 126 may increase a threshold time limit of a primary rule 126 (e.g., when a history of a participant 106 indicates that media 110 has always been uploaded within a threshold time limit). The computing device 102 may distinguish between primary rules 126 and secondary rules 126 as primary rules 126 may indicate a threshold time limit while a second rule 126 may indicate an amount by which a threshold time limit is to be adjusted.

Furthermore, in examples where more than two participants 106 are associated with an incident, and/or a unit with two or more participants are associated with an incident, a same threshold time limit be used for the two participants 106 and/or the unit, or different threshold time limits may be used for the two participants 106 and/or the unit (e.g., the three participants 106-1, 106-2, 106-3 of the depicted unit may have different threshold time limits used to determine whether respective media 110-1, 110-2, 110-3 of respective recording devices 104-1, 104-2, 104-3 have been uploaded to the data store 108).

The display screen 116 is understood to be any suitable type of display screen at which an indication 128 that media 110 has not yet been uploaded to the data store 108 may be provided. For example, in FIG. 1, it is assumed that no respective media 110 of the recording devices 104 of the participants 106 have been uploaded to the data store 108, but that the computing device 102 has evaluated media uploads for the participants 106; hence, as depicted in FIG. 1, the indication 128 initially shows that media uploads are missing for "0" participants 106. However, it is understood that the indication 128 may be updated by the computing device 102 to show a number of participants 106 with associated missing media uploads, and time periods (e.g., a number of days), for which media uploads are missing and/or a minimum time period, for which media uploads are missing. Such an evaluation of media uploads is described in more detail below with respect to FIG. 4.

As depicted, the indication 128 may be provided in the form of a card at the display screen 116, that may be provided as one of a plurality of cards in a card-based environment at the display screen 116. However, the indication 128 may be provided in any suitable format and/or in any suitable environment.

Figure 2:
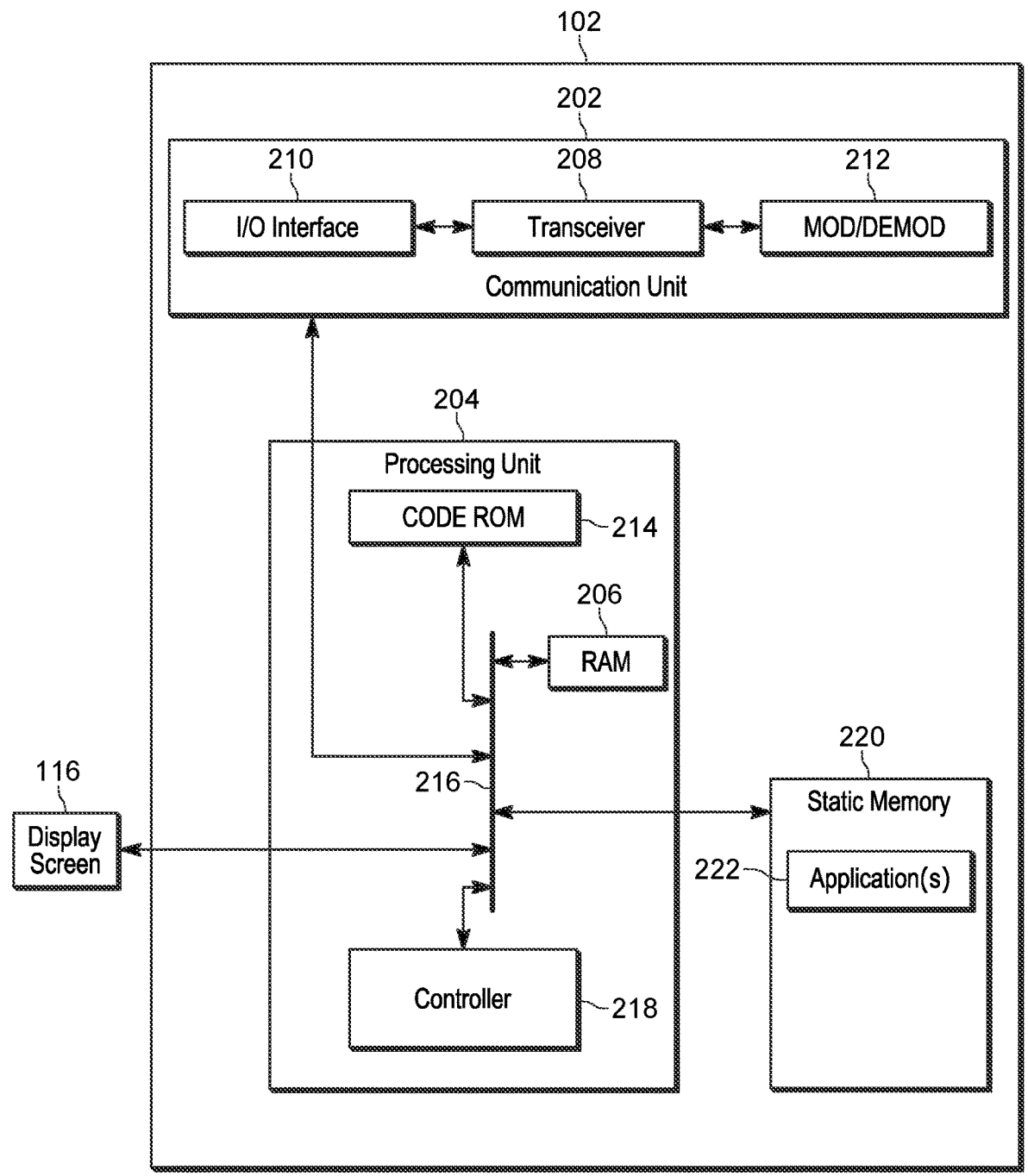
FIG. 2 is a device diagram showing a device structure of communication device for providing an indication that media has not yet been uploaded to a data store, in accordance with some examples.

Attention is next directed to FIG. 2, which depicts a schematic block diagram of an example of the computing device 102. While the computing device 102 is depicted in FIG. 2 as a single component, functionality of the computing device 102 may be distributed among a plurality of components, such as a plurality of servers and/or cloud computing devices.

As depicted, the computing device 102 comprises: a communication unit 202, a processing unit 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. The controller 218 is understood to be communicatively connected to other components of the computing device 102 via the common data and address bus 216. Hereafter, the at least one application 222 will be interchangeably referred to as the application 222.

Furthermore, while the memories 206, 214 are depicted as having a particular structure and/or configuration, (e.g., separate RAM 206 and ROM 214), memory of the computing device 102 may have any suitable structure and/or configuration.

While not depicted, the computing device 102 may include one or an input device and/or a display screen, which are also understood to be communicatively coupled to the communication unit. However, as depicted, the controller 218 is depicted as communicatively coupled to the display screen 116 external to the computing device 102.

As shown in FIG. 2, the computing device 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for providing an indication that media has not yet been uploaded to a data store. For example, in some examples, the computing device 102 and/or the controller 218 specifically comprises a computer executable engine configured to implement functionality for providing an indication that media has not yet been uploaded to a data store.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

Figure 3:
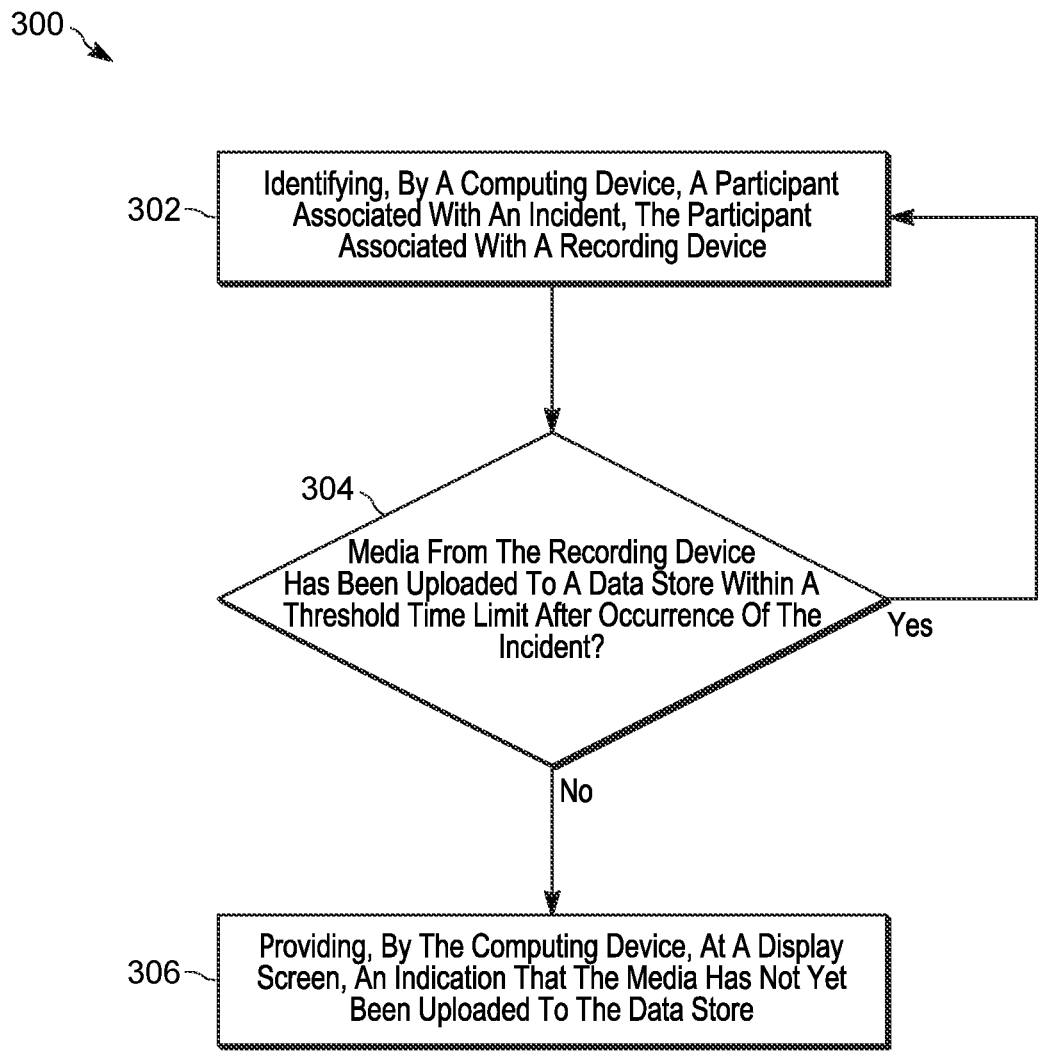
FIG. 3 is a flowchart of a method for providing an indication that media has not yet been uploaded to a data store, in accordance with some examples.

Furthermore, the memory 220 stores instructions corresponding to the at least one application 222 that, when executed by the controller 218, enables the controller 218 to implement functionality for providing an indication that media has not yet been uploaded to a data store, including but not limited to, the blocks of the method set forth in FIG. 3.

Furthermore, while not depicted, the memory 220 may store one or more of the incident records 122, one or more of the records 124 and/or one or more of the rules 126. Indeed, in some examples, the memory 120 may be at least partially combined with the memory 220. Furthermore, in other examples, one or more of the rules 126 may be incorporated into the application 222 (e.g., rather than being stored separately from the application 222).

In illustrated examples, when the controller 218 executes the one or more applications 222, the controller 218 is enabled to: identify a participant associated with an incident, the participant associated with a recording device; and in response to determining that media from the recording device has not yet been uploaded to a data store within a threshold time limit after occurrence of the incident: provide, at a display screen, an indication that the media has not yet been uploaded to the data store.

While details of the recording devices 104 are not depicted, the recording devices 104 may have components similar to the computing device 102 but adapted, for the respective functionality thereof. For example, a recording device 104 is understood to include one or more sensors, and the like, for acquiring media, such one or more sensors including, but not limited to, a camera, a video camera, a microphone, and/or any other suitable sensor and/or a combination thereof. The recording devices 104 may further comprise respective memories for Attention is now directed to FIG. 3, which depicts a flowchart representative of a method 300 for providing an indication that media has not yet been uploaded to a data store. The operations of the method 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222. The method 300 of FIG. 3 is one way that the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218 and/or the computing device 102 identifies a participant 106 associated with an incident, the participant 106 associated with a recording device 104.

For example, as has already been described, the controller 218 and/or the computing device 102 may monitor and/or process the incident records 122 and/or the records 124 to determine participants 106 associated with incidents, and recording devices 104 associated with participants 106.

Furthermore, as has already been described, a participant 106 may comprise one or more of a first responder assigned to an incident, a vehicle assigned to an incident, a unit assigned to an incident, or a combination thereof.

At a block 304, the controller 218 and/or the computing device 102 determines whether media 110 from the recording device 104 (e.g., identified at the block 302) has not yet been uploaded to the data store 108 within a threshold time limit after occurrence of the incident.

For example, as has already been described, the rules 126 may be used to determine a threshold time limit, and the incident records 122 and/or the records 124 may be used to determine whether a given incident is associated with any factors that indicate which rule 126 may be used to determine a threshold time limit. In particular, in some examples, the threshold time limit may be determined from one or more temporal upload rules 126 that vary based on one or more of: a type of an incident; a status of a participant 106; a rank of a participant 106; a history of a participant 106; and/or any other suitable factors.

In other examples, the threshold time limit may be determined from one or more temporal upload rules 126 that vary based on whether a given event occurred in association with an incident, for example as determined from an incident record 122.

In yet further examples, the threshold time limit may be determined from one or more temporal upload rules 126 that vary based on whether an incident has received one or more of media or social media coverage.

In response to determining that the media 110 from the recording device 104 has not yet been uploaded to the data store 108 within the threshold time limit after occurrence of the incident (e.g., a "NO" decision at the block 304), at a block 306, the controller 218 and/or the computing device 102 provides, at the display screen 116, the indication 128 that the media 110 has not yet been uploaded to the data store 108.

For example, the indication 128 may generically indicate that the participant 106 identified at the block 302 has not yet uploaded media 110 for the incident identified at the block 302, and an associated time period in which media 110 has not yet been uploaded, similar to the indication 128 as depicted in FIG. 1. In some examples, wherein more than one participant 106 has been identified at the block 302 that has not yet uploaded media 110, for one or more incidents identified at the block 302, the indication 128 may identify a number of such participants 106, and one or more associated time periods in which respective media 110 has not yet been uploaded. In some examples, only the smallest time associated time periods in which respective media 110 has not yet been uploaded may be identified in the indication 128. Another example of the indication 128 is described below with respect to FIG. 4.

Indeed, while the indication 128 may be particular to one participant 106 and one associated recording device 104 for one associated incident identified at the block 302, in other examples, the indication 128 may be further indicative that respective media 110 from one or more recording devices 104 associated with one or more incidents have not yet been uploaded to the data store 108 within one or more associated threshold time limits after occurrence of the one or more incidents. Hence, in these examples, at the block 302, the controller 218 and/or the computing device 102 may identify a plurality of participants 106 associated with one or more incidents, the plurality of participants 106 associated with respective recording devices 104.

Returning to the block 304, in response to determining that the media 110 from the recording device 104 has been uploaded to the data store 108 within the threshold time limit after occurrence of the incident (e.g., a "YES" decision at the block 304), the controller 218 and/or the computing device 102 continues to monitor participants 106 assigned to incidents at the block 302.

Yet further examples are within the scope of the present specification.

For example, the indication 128 may be activatable. In particular, the indication 128 may be selected by the user 114, via the input device 118 (e.g., by selecting and/or "clicking" on the indication 128 using a pointing device, and the like), which may cause the computing device 102 to, in response to the indication being activated, providing, at the display screen 116, details of one or more of:

- the participant 106 determined at the block 302, such as a name of the participant 106, a rank of the participant 106, and the like.
- a time period, past one or more of the occurrence of the incident or the threshold time limit, that the media 110 has not yet been uploaded. For example, a number of days that media 110 has not been uploaded for the incident determined at the block 302 may be provided at the display screen 116, the number of days being past a time that the incident occurred, and the like, and/or the number of days being past the threshold time limit.
- a last time that respective media associated with one or more of the recording device 104 or the participant 106, determined at the block 302, was uploaded to the data store 108. For example, a last date that the participant 106 uploaded associated media 110, from an associated recording device 104, to the data store 108 may be provided at the display screen 116.
- location history of one or more of the recording device 104 or the participant 106, determined at the block 302. For example, a last location of the one or more of the recording device 104 or the participant 106 may be provided at the display screen 116, and/or a map showing a history of locations of the one or more of the recording device 104 or the participant 106 may be provided at the display screen 116, and the like. In such examples, it is understood that a recording device 104 and/or an associated device (e.g., of a PAN) includes a location determining device, such as a Global Positioning System (GPS) device that is providing location updates to the computing device 102 and/or the data store 108.
- last known associated recording device status. For example, a last known status of the recording device 104 determined at the block 302 may be provided at the display screen 116; such a status may indicate a last time that the recording device 104 was "on" and/or used to acquire media 110, and the like.
- and/or any other suitable details.

However, in some examples, such details may be provided at the indication 128 without the indication 128 being activated.

Furthermore, an example of such details is described below with respect to FIG. 5.

As mentioned above, in some examples, at the block 302, the controller 218 and/or the computing device 102 may identify a plurality of participants 106 associated with one or more incidents, the plurality of participants 106 associated with respective recording devices 104, and/or the method 300 may be implemented more than once to identify such a plurality of participants 106.

Regardless, in these examples, when the indication 128 is activatable, the method 300 may further comprise, the controller 218 and/or the computing device 102, in response to the indication 128 being activated: providing, at the display screen 116, identities of a participant 106 and/or other participants 106, associated with one or more of an incident or other incidents, where associated media from associated recording devices 104 has not yet been uploaded within associated threshold time limits. In particular, the controller 218 and/or the computing device 102 may provide, at the display screen 116, for the participant and the other participants, one or more of: respective time periods past one or more of respective incidents or respective threshold time limits that respective media 110 has not yet been uploaded; a last respective time that the respective media associated with respective recording devices 104 was uploaded to the data store 108; a respective location history of one or more of a respective recording device 104 or a respective participant 106; a last known respective recording device status; and the like; and/or a combination thereof.

Hence, in some examples, for each participant 106 identified at the block 302, details thereof may be provided at the indication 128 and/or in response to the indication 128 being activated.

Yet further examples are within the scope of the present specification.

For example, the method 300 may further comprise the controller 218 and/or the computing device 102: identifying a plurality of participants 106 associated with the incident (e.g., the incident identified at the block 302); determining that a subset of the plurality of participants 106 have already uploaded respective media 110 to the data store 108 within a threshold time limit after occurrence of the incident, but that another subset of the plurality of participants 106 have not yet uploaded respective media 110 to the data store 108 within the threshold time limit after occurrence of the incident; generating links to already uploaded media 110; providing the links to request review of the already uploaded media 110; and responsive to receiving confirmation that the already uploaded media accurately represents the incident, removing the indication 128 from the display screen 116.

For example, with brief reference to FIG. 1, the participants 106-1, 106-2, 106-3 may be associated with a same incident (e.g., the unit of the participants 106-1, 106-2, 106-3 may be dispatched to an incident), and the participants 106-1, 106-2 (e.g., a subset of the participants 106-1, 106-2, 106-3) may cause respective media 110-1, 110-2 to be uploaded to the data store 108 within a threshold time limit (e.g., by operating the recording devices 104-1, 104-2), while the media 110-3 (e.g., associated with the participant 106-3) may not be uploaded to the data store 108 within the threshold time limit (e.g., the participant 106-3 representing another subset of the plurality of participants 106-1, 106-2, 106-3). As such, an indication that the media 110-3 has not yet been uploaded to the data store 108 may be provided at the display screen 116, as described above.

Furthermore, the participant 106-2 may be a supervisor, and the like, of the participants 106-1, 106-3. In these examples, computing device 102 may automatically generate links (e.g., Uniform Resource Locators (URLs)), to the media 110-1, 110-2 stored at the data store 108, and/or the computing device 102 may generate such links in response to the user 114 activating the indication 128, and the like, and/or by the user 114 generating such links via a menu system and the like. Regardless, the links may be transmitted to a communication device of the participant 106-2 (e.g., the participant 106-2 being a supervisor), who may operate a respective communication device to access and review the media 110-1, 110-2 via the links (e.g., at a display screen of the communication device). The participant 106-2 may be satisfied that the media 110-1, 110-2 accurately represent the incident and may operate their communication device to transmit, back to the computing device 102, a confirmation that the already uploaded media 110-1, 110-2 accurately represents the incident. The computing device 102, in response to receiving the confirmation, removes, from the display screen 116, the indication that the media 110-N has not yet been uploaded to the data store 108. An example of such a process is described in more detail below with respect to FIG. 6.

Figure 4:
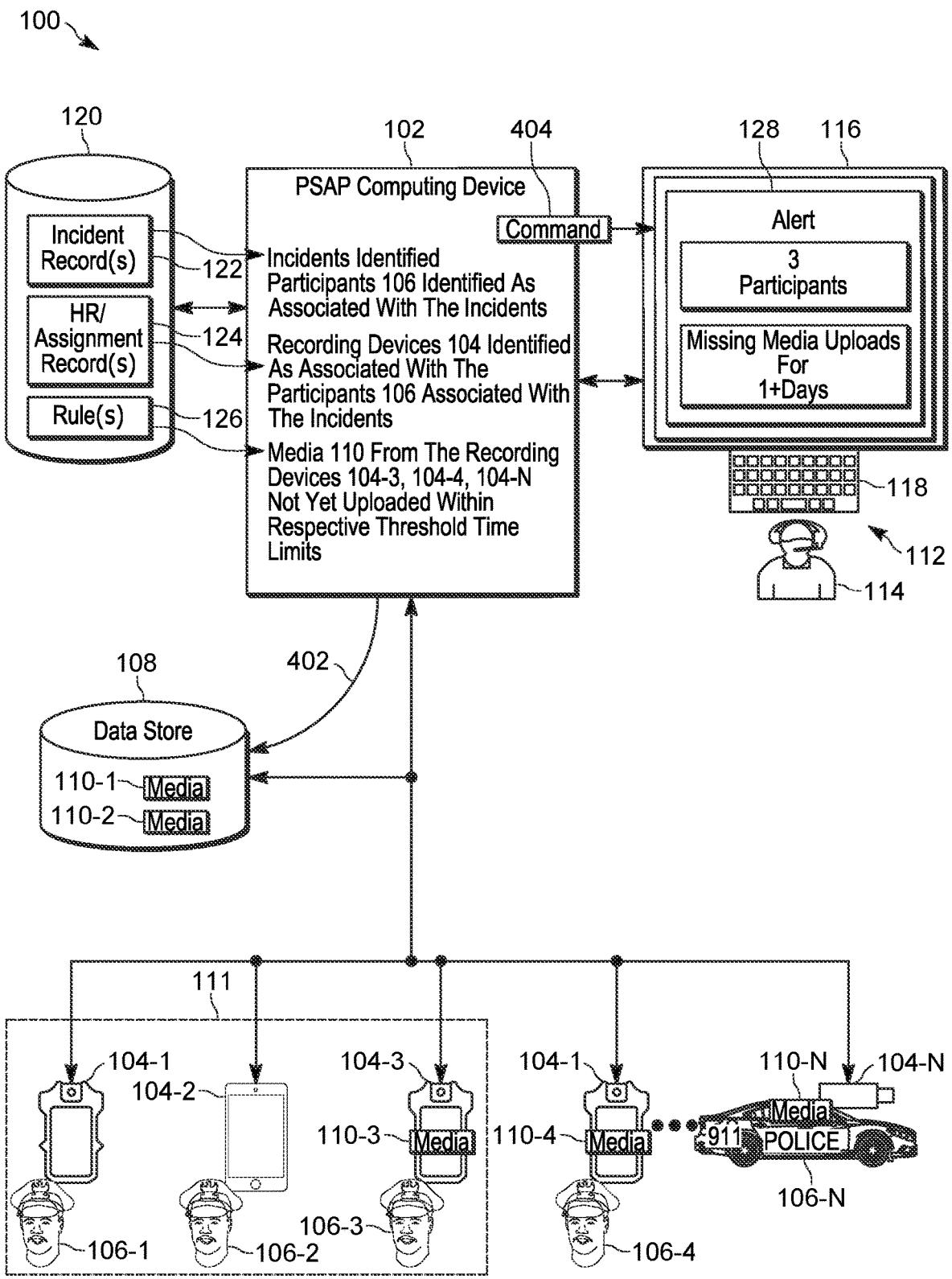
FIG. 4 depicts a method for providing an indication that media has not yet been uploaded to a data store being implemented in the system of FIG. 1, in accordance with some examples.
Figure 5:
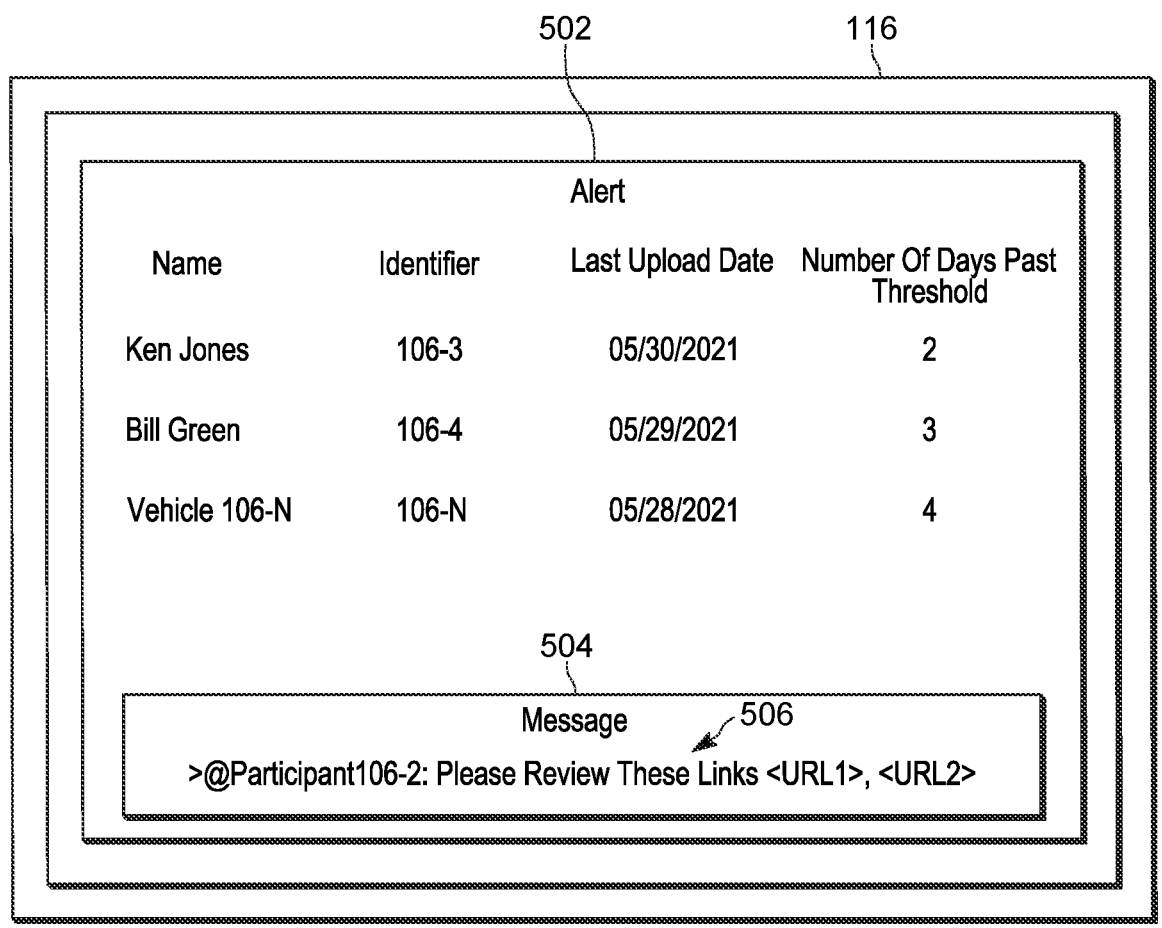
FIG. 5 depicts an example an indication that media has not yet been uploaded to a data store.
Figure 6:
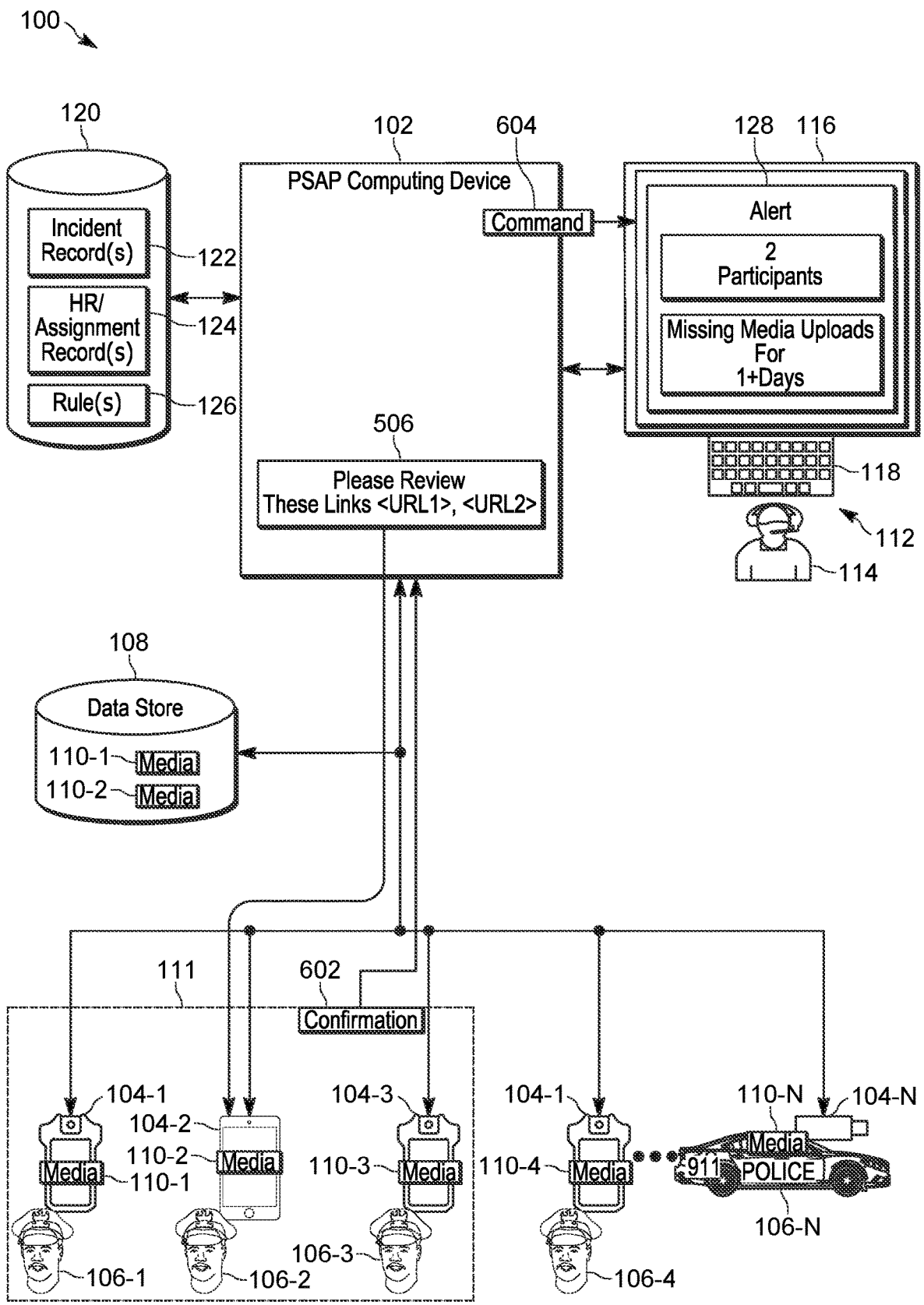
FIG. 6 depicts updating an indication that media has not yet been uploaded to a data store being implemented in the system of FIG. 1, in accordance with some examples.

Attention is next directed to FIG. 4, FIG. 5, and FIG. 6, which depict different aspects of examples described herein. FIG. 4 and FIG. 6 are substantially similar to FIG. 1 with like components having like numbers. FIG. 5 depicts details of an indication at the display screen 116; while the display screen 116 in FIG. 5 is depicted without other components of the system 100, such components are nonetheless understood to be present.

Attention is first directed to FIG. 4, in which it is assumed that the media 110-1, 110-2 has been uploaded to the data store 108 from the recording devices 104-1, 104-2. Furthermore, in FIG. 4, it is assumed that the computing device 102 identifies, from the incident records 122, incidents and further identifies the participants 106 associated with the incidents (e.g., with the computing device 102 accessing the incident records 122 represented by an arrow therebetween).

Furthermore, the computing device 102 identifies, from the records 124, respective recording devices 104 as being assigned to the identified respective participants 106 (e.g., with the computing device 102 accessing the records 124 represented by an arrow therebetween).

FIG. 4 further depicts the computing device 102 using one or more rules 126 to determine threshold time limits for uploading media 110 to the data store 108 (e.g., with the computing device 102 accessing the rules 126 represented by an arrow therebetween).

FIG. 4 further depicts the computing device 102 accessing the data store 108 and/or querying the data store 108 (e.g., as represented by an arrow 402) to determine whether media 110 from the identified respective recording devices 104 has been uploaded to the data store 108 within the respective threshold time limits.

In particular, the computing device 102 determines that the media 110-1, 110-2 from the recording devices 104-1, 104-2 has been uploaded to the data store 108 within respective threshold time limits, but that media 110 from the recording devices 104-3, 104-4, 104-N has not yet been uploaded to the data store 108. For example, while not depicted, the media 110-1, 110-2 may be stored at the data store 108 with respective identifiers used by the computing device 102 to determine that the media 110-1, 110-2 is associated with the identified incident and the participants 106-1, 106-2 (e.g., and/or the recording device 104-1, 104-2).

As such, the computing device 102 transmits and/or provides a command 404 to the display screen 116 to cause the indication 128 to be updated to show that three participants 106 are associated with media 110 that has not yet been uploaded to the data store 108. As such, the indication 128 has been updated in FIG. 4, relative to FIG. 1, to show that the number of participants 106 associated with media 110 that has not yet been uploaded to the data store 108 has been increased from zero (as in FIG. 1) to three (e.g., "3") participants (e.g., associated with one or more incidents).

Furthermore, the indication 128 has been updated in FIG. 4 to show a time a minimum time period of 2 or more days (e.g., "2+ Days") for media 110 associated with the three participants 106 has not been uploaded. For example, media 110 associated with the three participants 106 has not been uploaded for at least two days and/or more than two days past, for example, respective threshold time limits.

Attention is next directed to FIG. 5, which depicts an example of an indication 502 that may be provided in response to the indication 128 being activated. Alternatively, the indication 502 may be provided in place of the indication 128.

In particular, the indication 502 includes a name of participants 106 associated with media 110 that has not yet been uploaded to the data store 108 within a respective threshold time limit, a number of days past the respective threshold time limit (e.g., threshold time limit may be different for different participants 106), a respective identifier of the participants 106 (e.g., "106-3", "106-4", "106-N", which may correspond to badge numbers, and the like), and a last date that respective media 110 from a respective recording device 104 was uploaded to the data store 108. For example, as depicted, it is understood that a "name" of the participant 106-N (e.g., a vehicle) identified in the example of FIG. 4 is "Vehicle 106-N" and an associated identifier is "106-N".

Hence, the indication 502 provides more detail about participants 106 associated with media 110 that has not yet been uploaded to the data store 108 within a respective threshold time limit.

As depicted, the indication 502 further includes a region 504 that may be used by user 114 to a generate messages to a participant 106 to review media 110 uploaded to the data store 108. As depicted, the region 504 includes a message 506 to the participant 106-2 who may be a supervisor of the participants 106-1, 106-3 in a unit dispatched to, and/or associated with, a same incident, as well as links in the form of URLs to the media 110-1, 110-2 (e.g., <URL1>, <URL2>), which may be generated automatically by the computing device and/or by the user 114 operating the input device 118 to access a menu system and/or in any other suitable manner.

For example, attention is next directed to FIG. 6, which depicts the computing device 102 transmitting the message 506 to the recording device 104-2 (e.g., a mobile communication device) of the participant 106-2 who may operate the recording device 104-2 (e.g., the mobile communication device) to access the media 110-1, 110-2 via the links (e.g., <URL1>, <URL2>) to the media 110-1, 110-2 in the message 506. As depicted, the participant 106-2 may operate the recording device 104-2 (e.g., the mobile communication device) to transmit a confirmation 602 that the already uploaded media 110-1, 110-2 accurately represents the incident. As such, the computing device may remove an indication from the display screen 116 that the media 110-N has not yet been uploaded to the data store 108 within a threshold time limit, for example via a command 604. In particular, in FIG. 6, the number of participants 106 indicated at the indication 128 is consequently reduced to two (e.g., "2") from three. In examples where the indication 502 is provided, the details of the participant 106-3 may be removed from the display screen 116.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot control a display screen and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   providing, by a computing device, at a display screen, an indication of one or more of respective participants and respective recording devices associated with, or assigned to an incident, for which associated media uploads to a data store are missing, the incident represented by an incident record stored at a database, wherein the computing device comprises one or more of a server, cloud computing device and a public-safety answering point (PSAP), the computing device communicatively coupled to the display screen, the data store, and the database;
   identifying, by the computing device, a recording device associated with a participant dispatched to the incident, the recording device comprising one or more of a camera, a video camera, a body-worn camera, and a microphone, one or more of the recording device and the participant identified from records stored at the database, the participant comprising a first responder or vehicle or first responder units of a plurality of first responders or vehicles or first responder units dispatched to the incident;
   determining, by the computing device, a threshold time limit associated with compliance with public safety policies regarding providing of data to the data store;
   querying, by the computing device, the data store to determine whether media from the recording device has been uploaded to the data store within the threshold time limit after the occurrence of the incident, the media comprising one or more of video and audio recorded using the recording device;
   and
   in response to determining that the media from the recording device has not yet been uploaded to the data store within the threshold time limit after the occurrence of the incident:
      updating, by the computing device, at the display screen, the indication to show that the media has not yet been uploaded to the data store,
      wherein the indication is further indicative that respective media from a plurality of the recording devices associated with one or more incidents have not yet been uploaded to the data store within one or more associated threshold time limits after occurrence of the one or more incidents.

2. The method of claim 1, wherein the indication is activatable, and the method further comprises:

in response to the indication being activated, providing, at the display screen, details of one or more of:
  the participant;
  a time period, past one or more of the occurrence of the incident or the threshold time limit, that the media has not yet been uploaded;
  a last time that the respective media associated with one or more of the recording device or the participant, was uploaded to the data store;
  location history of one or more of the recording device or the participant; or
  last known associated recording device status.

3. The method of claim 1, wherein the indication is activatable, and the method further comprises, in response to the indication being activated:
  providing, at the display screen, identities of the participant and other participants, associated with one or more of the incident or other incidents, where associated media from associated recording devices has not yet been uploaded within associated threshold time limits.

4. The method of claim 3, further comprising, in response to the indication being activated:
  providing, at the display screen, for the participant and the other participants, one or more of:
    respective time periods past one or more of respective incidents or respective threshold time limits that the respective media has not yet been uploaded;
    a last respective time that the respective media associated with respective recording devices was uploaded to the data store;
    a respective location history of one or more of a respective recording device or a respective participant; or
    last known respective recording device status.

5. The method of claim 1, wherein the threshold time limit is determined from one or more temporal upload rules that vary based on one or more of:
  a type of the incident;
  events associated with the incident;
  use of force associated with the incident;
  a gunshot event associated with the incident;
  a complaint associated with the incident;
  a location of the incident;
  a status of the participant;
  a rank of the participant; or
  a history of the participant.

6. The method of claim 1, wherein the threshold time limit is determined by querying the database for one or more temporal upload rules that vary based on whether a given event occurred in association with the incident, the one or more temporal upload rules defining the threshold time limit.

7. The method of claim 1, wherein the threshold time limit is determined by querying the database for one or more temporal upload rules that vary based on whether the incident has received one or more of media or social media coverage, the one or more temporal upload rules defining the threshold time limit.

8. The method of claim 1, further comprising:
  identifying a plurality of participants associated with the incident;
  determining that a subset of the plurality of participants have already uploaded the respective media to the data store within the threshold time limit after occurrence of the incident, but that another subset of the plurality of participants have not yet uploaded the respective media to the data store within the threshold time limit after occurrence of the incident;
  generating links to already uploaded media, the links enabling access to the already uploaded media by one or more communication devices;
  providing, to the one or more communication devices, the links to request review of the already uploaded media; and
  responsive to receiving, from the one or more communication devices, confirmation that the already uploaded media accurately represents the incident, removing the indication from the display screen.

9. A device comprising:
  one or more of a server, cloud computing device and a public-safety answering point (PSAP);
  a communication unit;
  a controller communicatively coupled to the communication unit and a display screen, a data store, and a database, the controller configured to:
    provide, at the display screen, an indication of one or more of respective participants and respective recording devices associated with, or assigned to an incident, for which associated media uploads to a data store are missing, the incident represented by an incident record stored at a database;
    identify a recording device associated with a participant dispatched to the incident, the participant associated with a recording device, the recording device comprising one or more of a camera, a video camera, a body-worn camera, and a microphone, one or more of the recording device and the participant identified from records stored at the database, the participant comprising a first responder or vehicle or first responder units of a plurality of first responders or vehicles or first responder units dispatched to the incident;
    determine a threshold time limit associated with compliance with public safety policies regarding providing of data to the data store;
    querying, via the communication unit, the data store to determine whether media from the recording device has been uploaded to the data store within the threshold time limit after the occurrence of the incident, the media comprising one or more of video and audio recorded using the recording device; and
    in response to determining that the media from the recording device has not yet been uploaded to the data store within the threshold time limit after the occurrence of the incident:
      update, at the display screen, the indication to show that the media has not yet been uploaded to the data store,
      wherein the indication is further indicative that respective media from a plurality of the recording devices associated with one or more incidents have not yet been uploaded to the data store within one or more associated threshold time limits after occurrence of the one or more incidents.

10. The device of claim 9, wherein the indication is activatable, and the controller is further configured to:
  in response to the indication being activated, provide, at the display screen, details of one or more of:
    the participant;
    a time period, past one or more of the occurrence of the incident or the threshold time limit, that the media has not yet been uploaded;

a last time that the respective media associated with one or more of the recording device or the participant, was uploaded to the data store;

location history of one or more of the recording device or the participant; or last known associated recording device status.

11. The device of claim 9, wherein the indication is activatable, and the controller is further configured to, in response to the indication being activated:

provide, at the display screen, identities of the participant and other participants, associated with one or more of the incident or other incidents, where associated media from associated recording devices has not yet been uploaded within associated threshold time limits.

12. The device of claim 11, wherein the controller is further configured to, in response to the indication being activated:

provide, at the display screen, for the participant and the other participants, one or more of:
 respective time periods past one or more of respective incidents or respective threshold time limits that the respective media has not yet been uploaded;
 a last respective time that the respective media associated with respective recording devices was uploaded to the data store;
 a respective location history of one or more of a respective recording device or a respective participant; or
 last known respective recording device status.

13. The device of claim 9, wherein the threshold time limit is determined from one or more temporal upload rules that vary based on one or more of:

a type of the incident;
events associated with the incident;
use of force associated with the incident;
a gunshot event associated with the incident;
a complaint associated with the incident;
a location of the incident;
a status of the participant;
a rank of the participant; or
a history of the participant.

14. The device of claim 9, wherein the threshold time limit is determined by querying the database for one or more temporal upload rules that vary based on whether a given event occurred in association with the incident, the one or more temporal upload rules defining the threshold time limit.

15. The device of claim 9, wherein the threshold time limit is determined by querying the database for one or more temporal upload rules that vary based on whether the incident has received one or more of media or social media coverage, the one or more temporal upload rules defining the threshold time limit.

16. The device of claim 9, wherein the controller is further configured to:

identify a plurality of participants associated with the incident;

determine that a subset of the plurality of participants have already uploaded the respective media to the data store within the threshold time limit after occurrence of the incident, but that another subset of the plurality of participants have not yet uploaded the respective media to the data store within the threshold time limit after occurrence of the incident;

generate links to already uploaded media, the links enabling access to the already uploaded media by one or more communication devices;

provide, to the one or more communication devices, the links to request review of the already uploaded media; and responsive to receiving, from the one or more communication devices, confirmation that the already uploaded media accurately represents the incident, remove the indication from the display screen.

17. The method of claim 1, further comprising:

implementing a card-based environment, and wherein the indication comprises a card in the card-based environment.

18. The device of claim 9, wherein the controller is further configured to implement a card-based environment, and wherein the indication comprises a card in the card-based environment.

* * * * *